Patented Mar. 30, 1943

2,315,187

UNITED STATES PATENT OFFICE 2,315,187

CYANIDATION OF ORE PULPS WITH LIMITED AGITATION

Thomas G. Chapman, Tucson, Ariz., and Verne W. Winters, Los Angeles, Calif., assignors, by direct and mesne assignments, of one-half to said Chapman and one-half to The Eagle-Picher Mining and Smelting Company, Joplin, Mo., a corporation of Delaware No Drawing. Application July 24, 1941, Serial No. 403,838

10 Claims. (Cl. 75—2)

This invention relates to the recovery of gold values from gold ores, tailings or any other gold bearing materials containing the same. More particularly, it relates to the cyanidation of gold bearing ores and tailings whereby such ores and tailings are subjected to the action of a cyanide solution which dissolves the gold, the same being recovered from solution by sorption or precipitation.

In a general way, it may be stated that there are two types of treatment of gold ores by cyanide solution. One is the well known precipitation method wherein the ground ore is subjected to the action of cyanide solution until substantially all of the recoverable gold is dissolved, or until dissolution has reached an equilibrium, whereupon the gold bearing solution is separated from the solids of the ore pulp and the dissolved gold precipitated in metallic form by zinc or other metallic precipitant.

The other, and more recent, type of gold ore treatment is the continuous agitation of a pulp of ore and cyanide solution and the addition of properly prepared carbonaceous material to the ore pulp at any stage of the dissolution period for the purpose of sorbing or precipitating the gold dissolved by the cyanide. The carbonaceous material with the contained gold is separated from the ore pulp by froth flotation.

The present invention relates specifically to the latter type of cyanidation of gold ores, tailings or any other gold bearing materials and provides marked improvements and advantages over prior procedures, as will hereinafter fully appear.

Prior to the present invention, the standard methods of practicing cyanidation, with particular respect to the manner of contacting the ore with the cyanide solution comprise, first, the method known as the percolation of sands and, second, the method known as the continuous mechanical agitation of finely ground ores.

In the percolation of sands method, relatively coarsely crushed or ground ore containing a limited amount of finely divided constituent known as slime, is charged into a tank and the cyanide solution drained or percolated through the bed of ore, thus dissolving the gold. This method of treatment fails to operate successfully when the proportion of so-called slime is sufficient to interfere with the free passage of the solution through the bed of ore. Carbonaceous material has never to our knowledge been mixed with ores treated by this method of cyanidation.

In the event that a crushed or ground ore contains too much so-called slime to permit treatment by the percolation method, it has heretofore been treated by the second method mentioned, namely, that of continuous agitation. In this method of treatment by continuous agitation, finely ground ore, with a limited amount of coarse sand and a limited proportion of solids of the ore to cyanide solution, is placed in a container and continuously agitated by mechanical stirrers or by compressed air. The proportion of solids of the ore to cyanide solution permissible in continuous agitation, due to the limitations of continuous agitators, varies from about 30 per cent to about 45 per cent of the pulp by weight, and no method has been devised to continuously agitate economically pulps containing more than about 45 per cent of solids. A further limitation to the continuous agitation of ore pulps is that, not only is the proportion of sandy, granular material limited, but the maximum size of such sandy particles is also limited. Normally, the coarseness of grinding in preparing ores for continuous agitation is limited to approximately 65-mesh and, if coarser grinding is used, the coarser ore particles cannot be held in suspension with the density of pulps permissible with a reasonable expenditure of power, and these coarse particles, therefore, tend to segregate in the bottom of the agitator and finally choke the agitator for further operation.

It is an object of the present invention to provide a simple and novel manner of overcoming the inherent limitations of proportion of slime in the treatment of coarse sands, as encountered in the percolation method of cyanidation.

A further object is to provide a method of overcoming the inherent limitation of the size of ore particles encountered in the continuous agitation method of cyanidation.

A still further object is to permit the treatment of ore pulps containing substantially all proportions of solids and liquid whereby we are enabled to overcome the limitation of maximum proportion of solids encountered in the continuous mechanical agitation method of cyanidation.

A still further object of the invention is to provide a novel and convenient manner of adding a carbonaceous sorbent to the pulp for the purpose of exposing the pulp to the gold sorbing power of the carbonaceous material, and of removing from the pulp the carbonaceous material with its burden of sorbed values, without the necessity of froth flotation or other concentration step.

A still further object of the invention is to provide, in the cyanidation of gold ores with the use of a carbonaceous sorbent, a manner of procedure which dispenses with continuous agitation of the pulp and thus simplifies and makes more economical the recovery of the precious metal value.

A still further object is to take advantage of the long time period of contact permissible between the ore particles and cyanide solution with this invention, which in turn, permits coarser grinding of the ore with substantial savings in the cost of grinding.

Our method of cyanidation is essentially to make a pulp of crushed or ground gold ore, water, cyanide, and alkali, and to permit this pulp to remain in a container such as a tank, pond, or other suitable receptacle, in the presence of carbonaceous material, preferably activated charcoal, until the gold has been substantially transferred from the ore particles to the carbonaceous material without the assistance of continuous agitation, and then to recover the carbonaceous material with its contained gold, preferably by froth flotation. The unexpected and novel results obtained with this method of treating gold ores depends upon our discovery of the unexpected speed of migration of the soluble gold from the point of its dissolution to the carbon particles without the assistance of continuous agitation. Heretofore, it has been considered and taught that the recovery of gold depends largely on the degree of continuous agitation employed in bringing into rapidly changing contact the gold particles, free cyanide, and oxygen. It is therefore unexpected that a satisfactory gold recovery can be achieved with cyanide by eliminating both continuous agitation and the aeration of the pulp which accompanies continuous agitation.

We have discovered, as the essence of our invention, that, with most ores our new method of cyanidation does not require any agitation of the ore pulp beyond that required for the initial mixing of the ingredients of the pulp, namely, the crushed or ground ore, alkali, cyanide solution, and properly prepared carbonaceous material. Furthermore, and of great importance, we have also discovered that ore pulps comprising substantially all proportions of solid and liquid can be treated by the procedure of our invention. Our best results were obtained with ore pulps containing from 45 to 85 per cent of solids by weight.

We have further discovered that coarse sands, with such proportion of slime that is sufficient to interfere with treatment by the percolation method of cyanidation, can be treated by our present process and furthermore, mixtures predominating in finely divided particles but containing large proportions of coarse, granular, sandy material can also be successfully treated.

As a practical illustration of the manner in which our invention may be practiced we will give the following examples of actual experiments. It is to be understood, however, that these specific procedures are meant to be in no wise limiting, and that all variants thereof, within the scope of the appended claims, are to be considered within the spirit of the invention.

A sample of tailing from Arizona, containing 50 per cent of the material coarser than 35-mesh and some particles as coarse as one-quarter inch, was mixed with sufficient water to make a pulp containing 70 per cent of solids by weight. Alkali, cyanide, and activated charcoal were added at the rates of 1.0, 0.5 and 3.0 pounds per ton of ore respectively. The pulp was permitted to stand without agitation in a cylindrical container for 96 hours. After 96 hours the charcoal was separated from the pulp by froth flotation and the gold recovered from the charcoal. The recovery amounted to 67.7 per cent of the gold originally contained in the tailing.

A second test on this same material, ground previously to treatment to 35-mesh, and using a pulp of 75 per cent of solids, the treatment being otherwise identical with that just described, yielded a recovery of 92.4 per cent of the gold originally contained in the tailing.

Tests on other ores, up to the treatment of 500 pounds of ore, yielded satisfactory results.

Whereas examples of proportions of the ingredients of the pulp mixtures and the degree of agitation have been given above, it is to be understood that the proportions of ingredients and time of treatment can be varied to good advantage with each ore treated and agitation can be intermittently used if desired. The important features of the invention are, first, that continuous agitation is not necessary or desirable, and, second, that thicker ore pulps can be employed than heretofore possible, and third, that certain ore pulps heretofore limited with respect to proportions of slime or granular, coarse sand can be treated by the procedure of the present invention.

In the practice of our invention, substantially no limitations exist with respect to the proportions of either slime or coarse, granular materials that may be contained in the ore pulps to be treated, whereas all previously known methods of cyanidation have either one or the other of these limitations.

Since, in the present invention, the pulps require a comparatively small amount of solution per ton of ore treated, it follows that for a given weight of cyanide used per ton of ore treated, the concentration of cyanide in the solution will be higher than that of solutions used in the continuous agitation process of cyanidation, with the more dilute pulps required in the latter process.

The thicker pulps permitted by the present invention will occupy a smaller volume of container per ton of ore treated than the thinner pulps of the continuous agitation method of cyanidation, and thus permit of economy in plant construction.

No expenditure of power is necessary, with this method of cyanidation, after the initial mixing of the ingredients of the pulp, as contrasted to the continuous expenditure of power in the continuous agitation method of cyanidation.

With this method of cyanidation no attention is necessary after the charge is placed in the container until the transfer of the gold from the ore to the carbonaceous material has been effected.

Long periods of contact between the ore and cyanide solution are permissible, in the present invention, due to the facts that the initial cost of the container per ton of daily capacity is low and no expenditure of power for agitation is necessary. The longer period of time of contact permissible between the ore and cyanide solution in turn permits coarser grinding of the ore with substantial savings in the cost of grinding.

Since any size of container can be erected, of concrete, steel, wood, or other suitable material, the present method of cyanidation is particularly adapted to small scale plants as well as large scale plants.

In describing this method of cyanidation, we have pointed out that the preferable method of separating the carbonaceous material, which is added to the pulp to adsorb the gold dissolved by the cyanide, is by froth flotation. In this present invention we have discovered an alternative method of adding the carbonaceous material to the ore pulp and separating it therefrom which is as follows: The carbonaceous material properly activated for adsorbing the soluble gold, is placed in a container made of porous membranes such as filter paper, muslin, cotton cloth, canvas, or other suitable materials. The container, with its enclosed carbonaceous material, is then placed in the ore pulp or the solution thereof until the adsorption of the gold dissolved by the cyanide has been substantially completed whereupon the container, with the carbonaceous material and gold contained therein, is removed and the gold recovered from the carbonaceous material. By carrying out experiments with this method of adding the carbonaceous material the applicants have discovered that the gold ions will migrate from the pulp through the porous membrane to the carbonaceous material, whereas the solid particles of the ore pulp cannot so migrate.

Having thus disclosed our invention, what we claim as new, and desire to secure, by Letters Patent is:

1. The steps in the cyanidation of gold ores, tailings or any other gold bearing material which comprise dissolving gold by cyanide, and sorption of the dissolved gold by carbonaceous material without continuously agitating the pulp mixture during the dissolving and sorbing actions.

2. The method in the cyanidation of gold ores, tailings or any other gold bearing materials which comprises dissolving gold by cyanide in an ore pulp without continuously agitating said ore pulp, adding carbonaceous material at any stage of the dissolving action whereby the dissolved gold is sorbed by the carbonaceous material, without continuously agitating said ore pulp during the sorbing action and separating the carbonaceous material with its contained gold from the ore pulp by froth flotation.

3. A method in the cyanidation of ores, tailings, or any other gold bearing material which comprises dissolving the gold by cyanide in an ore pulp of any proportion of solids and liquid without continuously agitating said ore pulp, adding carbonaceous material to the ore pulp at any stage of the dissolving action whereby the gold is sorbed by said carbonaceous material and separating the carbonaceous material with its contained gold from the ore pulp by froth flotation.

4. A method for the extraction of gold from its ores and tailings by cyanidation which comprises preparing an ore pulp containing in excess of 45 per cent of solids, dissolving the gold by cyanide, and sorbing the gold so dissolved by carbonaceous material without continuously agitating said ore pulp.

5. A process in cyanidation which comprises dissolving of gold from ores, tailings or any other gold bearing material by cyanide solution, adding to the ore pulp at any stage of the dissolving period a carbonaceous material enclosed in a perforated container, sorbing the dissolved gold with said carbonaceous material, separating said perforated container with its contained carbonaceous material from the ore pulp and recovering the gold from the carbonaceous material.

6. A process of cyanidation which comprises dissolving of gold from ores, tailings, or any other gold bearing material by cyanide solution, adding to the liquid of the ore pulp at any stage of the dissolving action a carbonaceous material enclosed in a perforated container, sorbing the dissolved gold with said carbonaceous material, separating said perforated container with its contained carbonaceous material from the ore pulp, and recovering the gold from the carbonaceous material.

7. The method of producing the migration of dissolved gold through a perforated container pervious to the migration of dissolved gold in a cyanide solution which comprises bringing carbonaceous material into contact with said perforated container, placing said perforated container with said carbonaceous material in contact with the cyanide solution in the ore pulp to produce a migration of the dissolved gold in the cyanide solution through said perforated container and onto said carbon and removing the perforated container with the carbonaceous material from contact with the cyanide solution.

8. The method of treating gold bearing ores, tailings or any other gold bearing material whereby the ore pulp is freed from all limitation with respect to the proportion of slime and granular material contained therein, which comprises preparing a pulp of gold ore, tailings or any other gold bearing material without limitation in the proportion of slime or granular material contained therein, dissolving the gold in said pulp with cyanide solution substantially without agitation and sorbing the resulting dissolved gold with carbonaceous material.

9. The method of treating gold bearing ores, tailings, or any other gold bearing material to recover gold values therefrom which comprises mixing together gold bearing ore, cyanide solution, alkali and activated carbon and then dissolving the gold and sorbing the same on carbon by allowing the mixture to stand for a period of time sufficient to dissolve and to sorb the gold.

10. The method of sorbing gold by means of a carbonaceous sorbent which comprises adding a perforated container having a carbonaceous material therein to an ore pulp containing dissolved gold in cyanide solution and thereby causing the dissolved gold to migrate through the perforated container and becoming sorbed on the carbonaceous material.

THOMAS G. CHAPMAN.
VERNE W. WINTERS.